United States Patent [19]

Betts et al.

[11] 4,432,202

[45] Feb. 21, 1984

[54] FLOW-THROUGH PYROTECHNIC DELAY

[75] Inventors: Robert E. Betts; Nathan P. Williams; Arnold T. Stokes, all of Huntsville, Ala.

[73] Assignee: The United States of America as represented by the Secretary of the Army, Washington, D.C.

[21] Appl. No.: 261,347

[22] Filed: May 7, 1981

[51] Int. Cl.³ ............................ F02K 9/10; F02K 9/28
[52] U.S. Cl. ........................................ 60/221; 60/245; 60/253
[58] Field of Search ................... 60/39, 823, 251, 221, 60/263, 39.47, 255, 256, 632, 638, 245, 253; 102/275, 280, 202.13, 440, 380; 222/389; 169/33, 73

[56] References Cited

U.S. PATENT DOCUMENTS

| 692,819 | 2/1902 | Bissell | 102/440 |
| 2,949,009 | 8/1960 | D'Ooge | 60/39.47 |
| 3,023,573 | 3/1962 | Friedman | 60/39.47 |
| 3,713,389 | 1/1973 | Hjelm | 102/380 |
| 4,046,076 | 9/1977 | Hampton | 102/380 |

*Primary Examiner*—Carlton R. Croyle
*Assistant Examiner*—Jeffrey A. Simenauer
*Attorney, Agent, or Firm*—Robert P. Gibson; Anthony T. Lane; Harold W. Hilton

[57] ABSTRACT

A pyrotechnic delay system for controlling the time of events from initiation of an initial ignition impulse to ignition of a secondary output.

7 Claims, 5 Drawing Figures

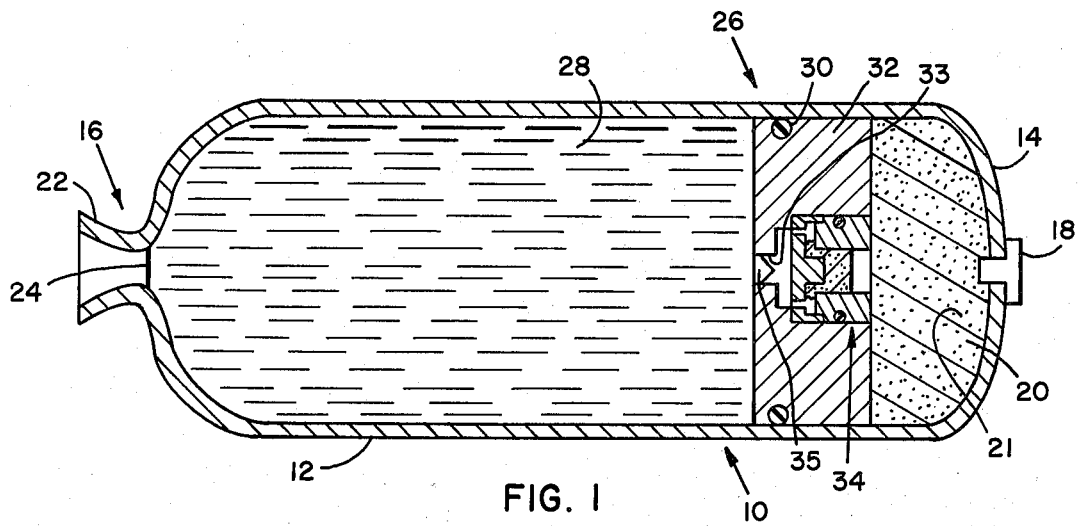
FIG. 1
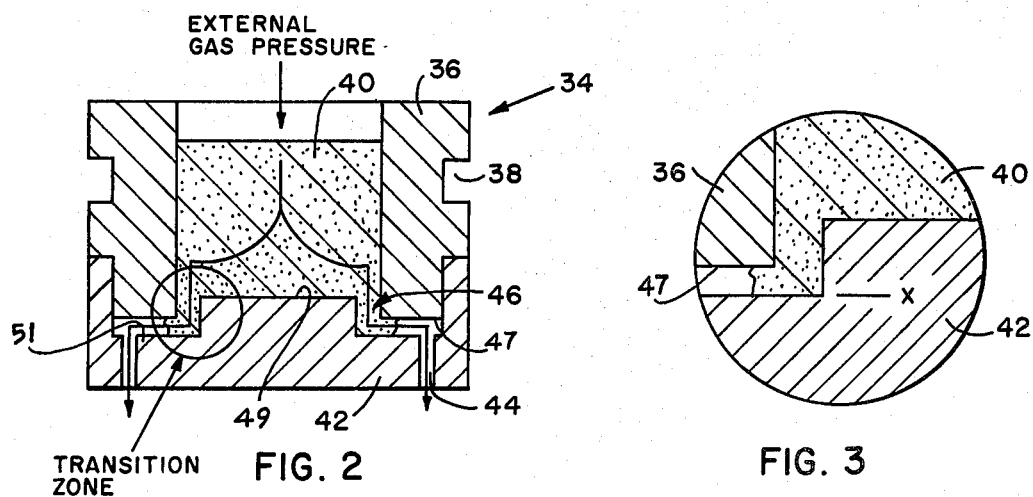
FIG. 2
FIG. 3
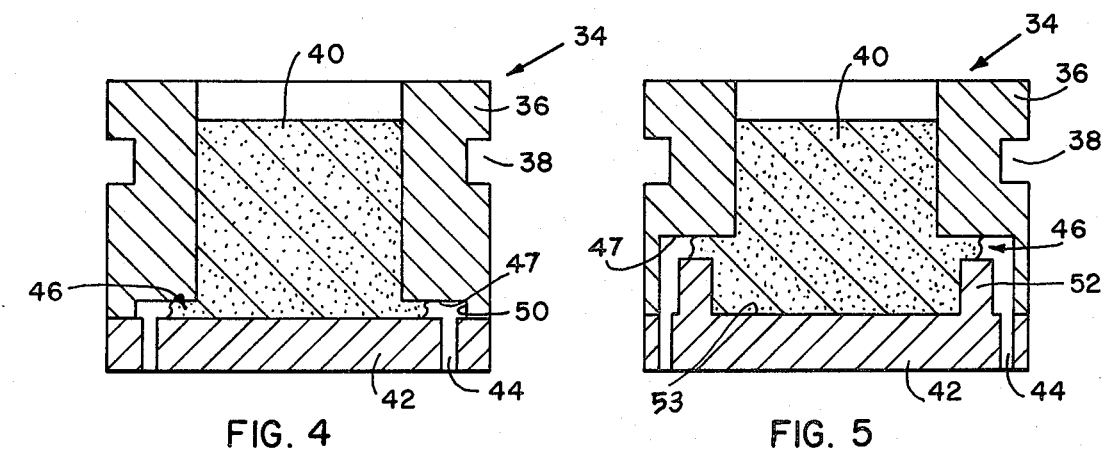
FIG. 4
FIG. 5

FLOW-THROUGH PYROTECHNIC DELAY

DEDICATORY CLAUSE

The invention described herein may be manufactured, used, and licensed by or for the Government for governmental purposes without the payment to us of any royalties thereon.

BACKGROUND OF THE INVENTION

Pyrotechnic delays are used to control the time of events from the initiation of an initial impulse to the initiation of a secondary impulse, or output. Typically the delay is initiated by a thermal energy input. Timing is achieved by the linear reaction rate of a column of the pyrotechnic. Factors such as type of pyrotechnic ingredients, geometry of the pyrotechnic column, type and geometry of column of the pyrotechnic container, operation pressure and temperature are the parameters used in designing a pyrotechnic column. When the delay burns the desired length it intiates a secondary change which is the desired event. When the secondary event occurs the housing containing the pyrotechnic has no further need, and it either remains dormant or is destroyed. The device of the present invention allows a controlled use of the pyrotechnic delay column and housing while maintaining a controlled function of the timing event.

When a rocket is fired from the shoulder of a soldier, the delay time is necessary so the rocket will be at a safe distance from the gunner if the hot gases are expended after launch. The controlled hot gas expulsion provides additional impulse to the rocket.

The difference between this invention and other pyrotechnic delay devices is that the pyrotechnic delay device column housing is used as a bleed orifice for high pressure hot gases. The construction of this housing is such that the delay pyrotechnic is pressed such that a major portion of the pyro is mechanically supported which allows high pressure to be on the upper side of the delay column without extruding it through the vent orifices. At the lower outer edge is a transitional zone which has structure support in the direction of the external force. Once the delay pyro has burned into the transitional zone the external pressure then breaks thru and allows gas flow thru the column housing. This construction allows more precise control of the delay by supporting the pyro column thereby prohibiting premature break-up. This type of support differs from others in that there are no other supports below the delay column, and when the delay is complete, venting occurs through the delay housing to the atmosphere.

In one application, the delay mechanism is mounted in a rocket motor. The pyrotechnic delay device is mounted in a piston, which is mounted in the casing of a rocket motor. On the upper side of the piston is a solid propellant rocket motor and on the lower or aft side of the piston is a liquid held in the casing by a closure member. Responsive to ignition of the gas generator the piston is moved rearwardly, the closure member is ruptured and liquid is extruded through the nozzle by rearward motion of the piston. The liquid is expelled behind the gunner (the weapon is fired from the shoulder) and the missile is at a safe distance from the gunner when gases are expelled.

SUMMARY OF THE INVENTION

A pyrotechnic delay device including a housing comprised of a sleeve mounted on a base plate. The sleeve and base plate encloses a pyrotechnic mix which is ignitable by a gas generator spaced from the device. Passages are provided in the base plate and communicate with passages between the base plate and sleeve. Gases are permitted to vent through the passages after ignition of the gas generator.

BRIEF DESCRIPTION OF THE DRAWINGS

FIG. 1 is an elevational sectional diagrammatic view of a rocket motor having the pyrotechnic delay mechanism mounted therein.

FIG. 2 is an enlarged sectional view of the pyrotechnic delay mechanism of FIG. 1.

FIG. 3 is an enlarged elevational sectional view of the transition zone of the pyrotechnic delay device of FIG. 2.

FIGS. 4 and 5 are elevational sectional views of additional embodiments of the pyrotechnic delay device of the present invention.

DESCRIPTION OF THE PREFERRED EMBODIMENT

As seen in FIG. 1, a rocket motor 10 includes a casing 12 having a forward portion 14 and an aft portion 16. An igniter 18 and a solid propellant gas generator 20 is carried in the forward end of the motor and a nozzle 22 is carried at the aft end of the motor. A nozzle closure 24 is mounted in the nozzle. A piston assembly 26 is carried in casing 12 intermediate gas generator 20 and a liquid 28. Assembly 26 includes an O-ring member 30, a piston 32, and the pyrotechnic delay device 34 mounted above an opening 33 in the piston. Device 34 includes a sleeve 36 (FIG. 2), an O-ring groove 38, a pyrotechnic mix 40, an annular base member 42 secured to sleeve 36. A plurality of vent paths 44 are arranged in a circle through base member 42 and communicate with a transitional zone 46 provided between base 42 and sleeve 36. As seen in the Figures, the transitional zone includes passages 47 disposed adjacent to and between the base plate and sleeve 36. The passages are in direct communication with the pyro mix 40 and vent passages 44 of base plate 42. As seen in FIG. 2, plate 42 includes a central raised portion 49 and a lower annular stepped portion 51.

In operation, igniter 18, ignites solid propellant gas generator 20 which pressurizes chamber 21 at the forward end. As the propellant 20 burns, rupture disc 24 opens allowing liquid to exit, thereby creating thrust. The volume above piston 32 increases and the volume below the piston decreases. The pressure above piston 32 is in excess of 6000 psi and moves the piston rearwardly. The delay is initiated by gas generator gases and burns for a predetermined time. When the piston reaches the aft end of the motor a nylon plug 35, press fitted in opening 33 of the piston is expelled. When the delay assembly "burns through", gases are vented through the delay assembly and out of the rocket.

The area through the transition zone and passages 44 are greater than the throat area of the rocket and opening 33, thereby preventing nozzling and reducing erosion at the transition zone. Also, the geometry of the transitional zone allows structural integrity of the pyro mix under high external gas pressure without premature break-up. The pyro burns to a predetermined level (x)

before external pressure causes structural failure of the pyro mix to allow "flow through".

FIG. 4 illustrates a pyrotechnic delay device 34 including the pyrotechnic mix 40 carried in sleeve 36 and base plate 42. Sleeve 36 is cut-back at 50 to provide a transitional zone 46 between vent passages 44 and the pyro mix 40.

FIG. 5 illustrates a pyrotechnic delay device 34 including the pyrotechnic mix 40 carried in sleeve 36 and base plate 42. Base plate 42 includes a raised portion 52 disposed around an annular central lower portion 53 to provide a transitional zone 46 between vent passages 44 and the pyro mix. The transitional zone is formed between sleeve 36 and raised portion 52.

We claim:

1. A delay device for controlling the time between initiation of a first impulse to initiation of a second impulse comprising:
   a. a first housing having igniter means carried therein;
   b. a sleeve and a base plate disposed in mating relation to form a chamber therebetween, said sleeve and said base plate forming a second housing, said second housing carried in said first housing;
   c. a pyrotechnic carried in said chamber;
   d. a plurality of vent passages extending through said base plate, said vent passages arranged in a circle in said base plate;
   e. a transition zone disposed in said second housing to vent gases from said chamber responsive to ignition of said pyrotechnic by said igniter means, said transition zone defined by passages disposed between said base plate and said sleeve, said transition zone passages disposed adjacent said chamber and said vent passages and in direct communication therewith.

2. Apparatus as in claim 1 wherein said first housing is the casing of a rocket motor, said motor having forward and aft ends, said igniter means being mounted in said forward end, and, a nozzle secured to said aft end.

3. Apparatus as in claim 2 wherein said igniter means includes an igniter secured at one end of said casing and a gas generator disposed in said casing below said igniter.

4. Apparatus as in claim 3 wherein said motor casing includes a piston mounted therein below said gas generator, said delay device mounted in said piston.

5. Apparatus as in claim 4 including a nozzle closure member secured in said rocket motor nozzle, and a liquid carried in said casing between said piston and said closure, 6. Apparatus as in claim 1 wherein said base plate includes a central raised portion and a lower annular stepped portion defining said transition zone.

7. Apparatus as in claim 1 wherein said base plate is provided with a central lower portion having an annular raised portion therearound, said transition zone being formed between said sleeve and said annular raised portion.

* * * * *